April 2, 1929. E. B. SMITH 1,707,884
SIGNALING DEVICE
Filed May 16, 1927 2 Sheets-Sheet 1
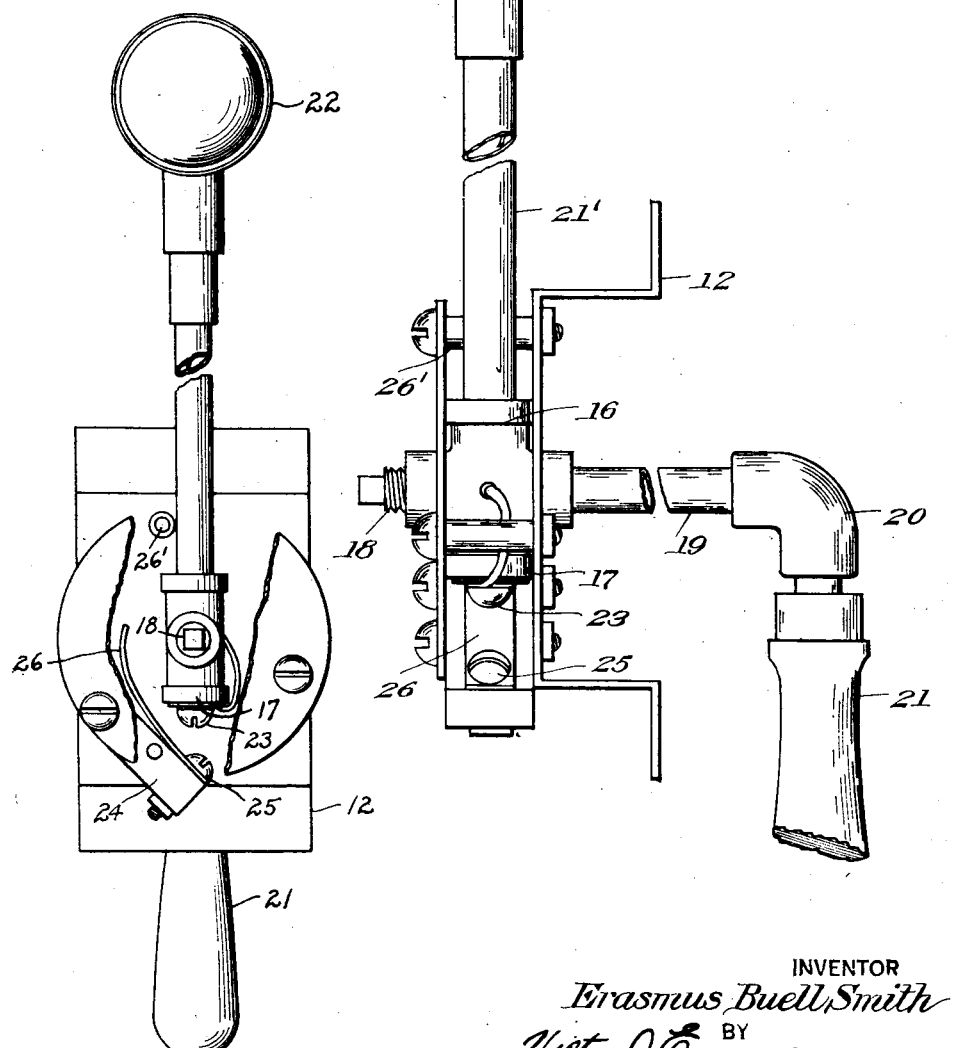
INVENTOR
Erasmus Buell Smith
BY
Victor J. Evans
ATTORNEY

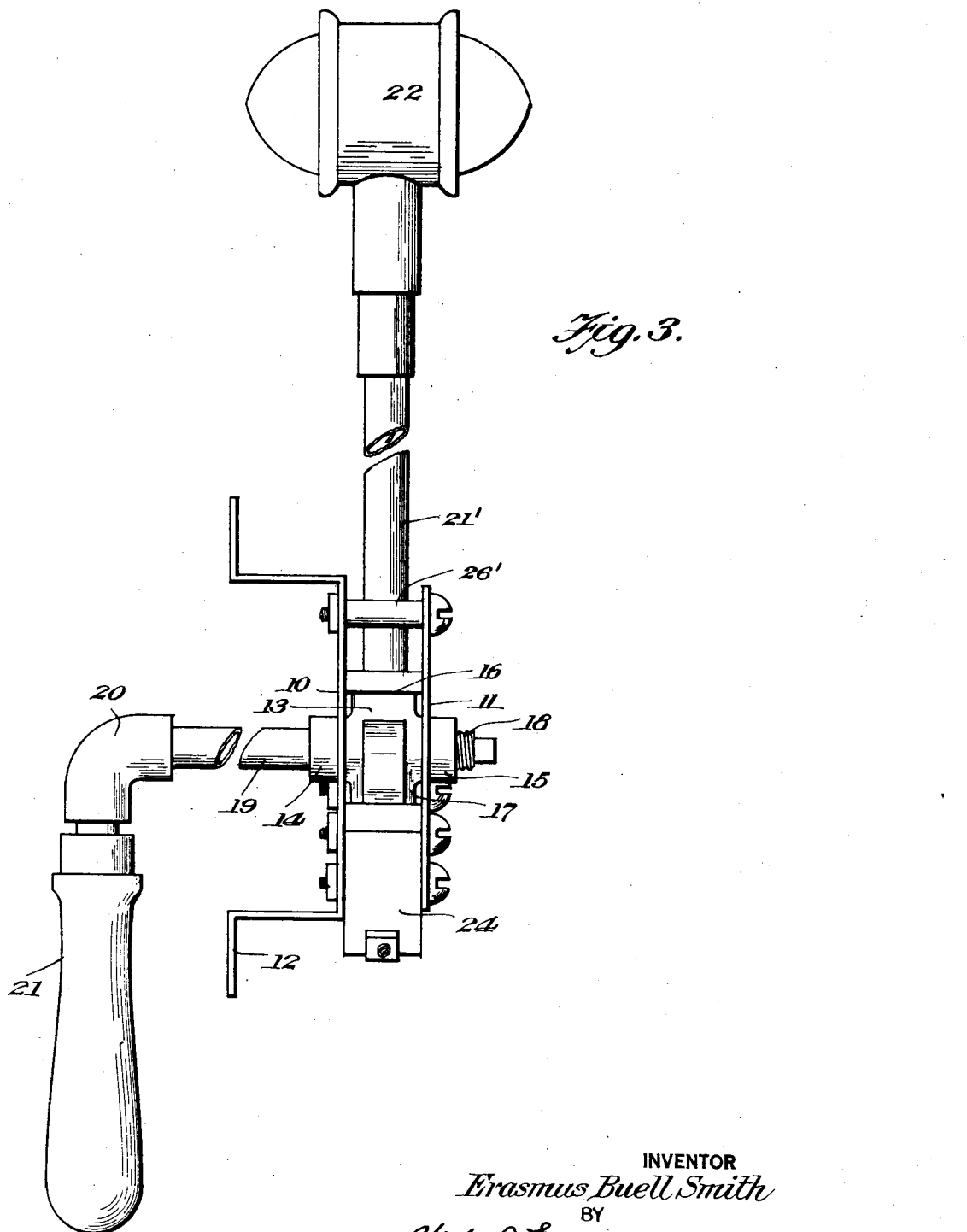

Patented Apr. 2, 1929.

1,707,884

UNITED STATES PATENT OFFICE.

ERASMUS BUEL SMITH, OF OTTAWA, KANSAS.

SIGNALING DEVICE.

Application filed May 16, 1927. Serial No. 191,841.

This invention relates to improvements in direction signals for automobiles and has for an object the provision of means whereby the driver of an automobile may conveniently indicate to others an intended change in direction of travel.

Another object of the invention is the provision of a signal for the above purpose which is simple in construction, in that it is formed principally of stock material and may be readily attached to a vehicle for use.

Another object of the invention is the provision of means for yieldingly holding the signal against movement, together with novel means for controlling a circuit through an electric lamp which forms a part of the signal.

Another object of the invention is the provision of a signal which includes a signal mounting and a pivotally movable signal arm carried thereby, the manner of assembling the mounting also providing spaced stops to limit movement of the signal in opposite directions.

With the above and other objects in view, the invention further includes the following novel features and details of construction, to be hereinafter more fully described, illustrated in the accompanying drawings and pointed out in the appended claim.

In the drawings:—

Figure 1 is a front elevation of the signal with parts broken away.

Figure 2 is a side view.

Figure 3 is a view looking at the opposite side from that shown in Figure 2.

Referring to the drawings in detail wherein like characters of reference denote corresponding parts, the invention which is adapted to be applied to a closed automobile, comprises right and left hand signal devices, one of which is adapted to be placed at each side of the automobile, although only one of such devices is illustrated. The right and left hand signal devices are similar in construction, except that one is adapted to swing outwardly to the right, and the other outwardly to the left.

The improved signal as shown comprises inner and outer spaced plates 10 and 11 respectively, the inner plate 10 forming the attaching plate being provided with offset attaching ears 12 which are designed to be attached to the windshield frame of an automobile, or to the corner posts. The device is adapted to be made of stock material and comprises a four-way fitting 13, which includes arms 14, 15, 16 and 17. The arms 14 and 15 are mounted for pivotal rocking movement in the plates 10 and 11 and the arm 15 is closed by a plug 18. Secured to the arm 14 is a pipe section 19 which in turn has secured thereto an elbow 20, and secured to this elbow is an operating handle 21 which is designed to be located within the automobile in convenient reach of the driver.

Extending from the arm 16 is a relatively long pipe section 21' and mounted upon the outer end of this pipe section is a signal lamp whose casing is indicated at 22. The lamp includes an electric bulb (not shown) and the conductor wires for this bulb extend through the pipe 21 and have connection with a contact screw 23 which is carried by the arm 17. The lamp or bulb may be suitably grounded.

Mounted between the plates 10 and 11 is an insulated block 24, and secured to this block as indicated at 25 is one end of a spring arm 26, the latter forming a spring contact and being located in the path of the contact 23.

The plates 10 and 11 are connected by screws or bolts 26' which hold the plates in spaced relation, and one of these bolts is adapted to provide a stop to limit pivotal movement of the signal arm in one direction so that the arm will be in an inactive position, or vertical, while another of these bolts limits downward movement of the arm and maintains the arm in an active position. In this position the contacts 23 and 26 will engage to complete a circuit through the lamp. Sufficient binding action is provided between the plates 10 and 11 and the fitting 13 to prevent rattling or accidental pivotal movement of the signal arm.

The invention is susceptible of various changes in its form, proportions and minor details of construction and the right is herein reserved to make such changes as properly fall within the same scope of the appended claim.

Having described the invention what is claimed is:—

In an automobile signal, spaced plates having oppositely located openings therein and including an inner plate and an outer plate, offset attaching ears carried by the inner plate, a four-way fitting including two oppositely extending arms of uniform exterior diameter which extends through the openings of the plate and provide for rocking movement, a pipe section extending from one of the arms of said fitting and having a handle thereon extending within an automobile, a pipe section extending from said fitting at rightangles to the first mentioned pipe section and defining a signal arm, an electric lamp at the outer end of the signal arm, an electric contact secured to the fitting opposite the signal arm, a spring contact located in the path of the fitting carried contact, and means connecting the plates to limit pivotal movement of the signal arm in opposite directions.

In testimony whereof I affix my signature.

ERASMUS BUEL SMITH.